United States Patent
Lin et al.

(10) Patent No.: US 12,449,421 B1
(45) Date of Patent: Oct. 21, 2025

(54) ANTI-CD79B PROTEIN MONOCLONAL ANTIBODY, PRODUCTS CONTAINING THE SAME, AND USES THEREOF

(71) Applicant: Sichuan Cancer Hospital, Chengdu (CN)

(72) Inventors: Tongyu Lin, Chengdu (CN); Yang Liu, Chengdu (CN); Zongyao Huang, Chengdu (CN); Huangming Hong, Chengdu (CN); Junxuan Zhu, Chengdu (CN); Jun Hou, Chengdu (CN); Dan Luo, Chengdu (CN); Jingcheng Luo, Chengdu (CN)

(73) Assignee: Sichuan Cancer Hospital, Chengdu (CN)

( * ) Notice: Subject to any disclaimer, the term of this patent is extended or adjusted under 35 U.S.C. 154(b) by 0 days.

(21) Appl. No.: 19/251,906

(22) Filed: Jun. 27, 2025

(30) Foreign Application Priority Data

Mar. 21, 2025 (CN) .......................... 202510337343.5

(51) Int. Cl.
*G01N 33/577* (2006.01)
*C07K 16/28* (2006.01)
*G01N 33/68* (2006.01)

(52) U.S. Cl.
CPC ....... *G01N 33/577* (2013.01); *C07K 16/2803* (2013.01); *G01N 33/6872* (2013.01); *C07K 2317/565* (2013.01); *C07K 2317/567* (2013.01); *G01N 2333/70503* (2013.01)

(58) Field of Classification Search
CPC ............ C07K 16/2803; C07K 16/2896; C07K 2317/565; C07K 2317/567; C07K 2317/51; C07K 2317/515; G01N 33/577; G01N 33/6872; G01N 2333/70503
See application file for complete search history.

(56) References Cited

U.S. PATENT DOCUMENTS

| | | | | |
|---|---|---|---|---|
| 9,737,623 | B2 * | 8/2017 | Desnoyers et al. | A61K 51/1078 |
| 10,494,432 | B2 * | 12/2019 | Chen et al. | C07K 16/2803 |
| 10,981,987 | B2 | 4/2021 | Chen et al. | |
| 11,255,865 | B2 * | 2/2022 | Ganz et al. | G01N 33/74 |
| 11,866,496 | B2 * | 1/2024 | Chen et al. | C07K 16/2803 |
| 2009/0068202 | A1 | 3/2009 | Chen et al. | |
| 2022/0315663 | A1 * | 10/2022 | Ganesan et al. | C07K 16/2896 |
| 2023/0183371 | A1 * | 6/2023 | Chu et al. | C07K 16/2896 |

FOREIGN PATENT DOCUMENTS

| | | |
|---|---|---|
| AU | 2012200923 B2 | 4/2014 |
| CN | 101802013 A | 7/2023 |
| CN | 118557750 A | 8/2024 |
| WO | 2021076196 A | 4/2021 |

OTHER PUBLICATIONS

Office Action, CN Pat. Appl. No. 202411110872.3, dated Apr. 23, 2025; issued by the China National Intellectual Property Administration (ISA/CN), Beijing, China.

Notice of Grant of Invention Patent Rights, CN Pat. Appl. No. 202411110872.3, dated Jun. 13, 2025; issued by the China National Intellectual Property Administration (ISA/CN), Beijing, China.

Zarrineh et al., "Mechanism of antibodies purification by protein A," Analytical Biochem., vol. 609, 113909; Nov. 15, 2020; doi.org/10.1016/j.ab.2020.113909.

Dornan et al., "Therapeutic potential of an anti-CD79b antibody-drug conjugate, anti-CD79b-vc-MMAE, for the treatment of non-Hodgkin lymphoma," Blood, 114 (13): 2721-2729; 2009; doi.org/10.1182/blood-2009-205500.

Zheng et al., "In vivo effects of targeting CD79b with antibodies and antibody-drug conjugates," Mol Cancer Ther 2009;8(10). Oct. 2009.

Chu F, et al., "Chimeric antigen receptor T cells to target CD79b in B-cell lymphomas," J Immunother Cancer 2023;11:e007515. doi:10.1136/jitc-2023-007515.

Yang et al., "An antibody-drug conjugate in treating diffuse large B-cell lymphoma: polatuzumab vedotin," Chin J New Drugs Clin Rem, 1007-7669 (2020) 06-0346-03; DOI: 10.14109/j.cnki.xyylc.2020.06.05.

Rathore et al., "Purification of Therapeutic Antibodies by Protein A Affinity Chromatography," Methods Mol. Biol., 2022:2313:169-177; doi: 10.1007/978-1-0716-1450-1_9.

Mjias-Gomez et al., "A window into the human immune system: comprehensive characterization of the complexity of Antibody complementary-determining regions in functional antibodies," MAbs; Oct. 24, 2023; 15(1):2268255; doi: 10.1080/19420862.2023.2268255.

* cited by examiner

*Primary Examiner* — Kimberly Ballard
(74) *Attorney, Agent, or Firm* — Central California IP Group, P.C.; Andrew D. Fortney (57) ABSTRACT

An anti-CD79B protein monoclonal antibody and related products and uses thereof are disclosed. The anti-CD79B protein monoclonal antibody comprises a heavy chain and a light chain, wherein the heavy chain includes a heavy chain variable region, and the light chain includes a light chain variable region. The heavy chain variable region includes complementary-determining regions CDR1, CDR2, and CDR3 with amino acid sequences as shown in SEQ ID NO:1, SEQ ID NO:2, and SEQ ID NO:3, respectively. The light chain variable region comprises complementary-determining regions CDR1, CDR2, and CDR3 with amino acid sequences as shown in SEQ ID NO:9, SEQ ID NO:10, and SEQ ID NO:11, respectively. The anti-CD79B protein monoclonal antibody exhibits high specificity and sensitivity, enabling specific recognition of cells expressing CD79B protein. It is suitable for immunological detection, and effectively prevents false-positive and false-negative results in immunological assays, thereby further improving the accuracy of detection and diagnostic outcomes.

6 Claims, 4 Drawing Sheets
Specification includes a Sequence Listing.

ANTI-CD79B PROTEIN MONOCLONAL ANTIBODY, PRODUCTS CONTAINING THE SAME, AND USES THEREOF

CROSS-REFERENCE TO RELATED APPLICATIONS

This application claims priority to Chinese Pat. Appl. No. 202510337343.5, filed on Mar. 21, 2025, incorporated by reference herein in its entirety.

REFERENCE TO AN ELECTRONIC SEQUENCE LISTING

The contents of the electronic sequence listing (BJLZ-044CD.xml; Size: 16,571 bytes; and Date of Creation: Jun. 18, 2025) is incorporated herein by reference in its entirety.

TECHNICAL FIELD

The present invention relates to the field of biomedicine, and specifically concerns an anti-CD79B protein monoclonal antibody and uses thereof.

BACKGROUND

CD79B (also known as Ig-β) is a core component of the B-cell antigen receptor (BCR) complex, forming a heterodimer with CD79A (Ig-α) via disulfide bonds, which together anchor to the B-cell surface. This protein is a single-pass transmembrane receptor, featuring an Ig-like V-type domain in its extracellular region responsible for antigen binding, and an intracellular region containing an immunoreceptor tyrosine-based inhibitory motif (ITIM), which regulates signal transduction. CD79B expression precedes immunoglobulin heavy-chain gene rearrangement and CD20 expression, but disappears upon B-cell differentiation into plasma cells, making it a specific marker for early B-cell development. Due to its structural characteristics, CD79B plays a critical role in B-cell development, activation, antigen recognition, and initiation of downstream signaling pathways.

In normal B cells, CD79B and CD79A jointly mediate BCR signal transduction. Upon antigen binding, the ITIM motif of CD79B is phosphorylated and activated by kinases such as Lyn, and subsequently, by recruiting molecules like SYK and CARD11 to activate the PI3K/AKT and NF-κB pathways. The former regulates cell metabolism and survival, while the latter promotes proliferation and inflammatory responses. Furthermore, CD79B supports B-cell survival by maintaining BCR surface expression, and its deficiency can lead to arrested B-cell development. In lymphomas, CD79B abnormalities primarily involve mutations and dysregulated expression. For example, approximately 20%-21% of diffuse large B-cell lymphomas (DLBCL) harbor CD79B mutations, frequently localized in the intracellular ITAM domain (e.g., the Y196 site), resulting in constitutive BCR signaling activation. In chronic lymphocytic leukemia (CLL), CD79B is expressed in 18%-20% of cases and correlates with trisomy 12 and CD22/FMC7 positivity, suggesting its expression may be linked to disease subtype differentiation.

Currently, CD79B antibodies can be prepared by various methods including hybridoma technology and phage display technology. For instance, some research institutions have employed genetic engineering techniques to humanize these antibodies, thereby reducing immunogenicity and enhancing their safety and efficacy in human applications. For immunohistochemical (IHC) staining, existing technologies typically utilize automated staining instruments and standardized staining protocols to improve consistency and accuracy. Furthermore, standardized interpretation methods and scoring systems have been established specifically for CD79B IHC staining, enabling pathologists to evaluate results with greater precision.

However, regarding existing CD79B antibodies, although CD79B exhibits relatively specific expression in B cells, aberrant expression or cross-reactivity may occur under certain exceptional circumstances, such as in some non-B cell-derived tumors or pathological conditions, potentially leading to false-positive results. For instance, rare tumor types or cases of abnormal cellular differentiation may demonstrate non-specific CD79B expression, compromising diagnostic accuracy. Conversely, weak staining or undetectable signals may arise in lesions or tumor cells with low CD79B expression, resulting in false-negative outcomes. This is particularly observed in certain early-stage B-cell lymphomas or tumors with high cellular heterogeneity, where subpopulations of cells with low CD79B expression levels may evade detection, adversely affecting diagnostic precision. Thus, there remains an urgent need to address the challenges of false positives and false negatives in immunological assays employing CD79B antibodies.

SUMMARY

To address the aforementioned technical challenges, a first aspect of the present invention provides an anti-CD79B protein monoclonal antibody having high specificity and sensitivity. This antibody specifically recognizes cells expressing CD79B protein, making it not only suitable for immunological detection but also effective in preventing false-positive and false-negative results, thereby significantly improving the accuracy of detection and diagnosis. A primary inventive concept is as follows:

An anti-CD79B protein monoclonal antibody comprises a heavy chain and a light chain, wherein the heavy chain includes a heavy chain variable region, and the light chain includes a light chain variable region. The heavy chain variable region comprises complementary-determining regions (CDR1, CDR2, and CDR3) having amino acid sequences as shown in SEQ ID NO:1, SEQ ID NO:2, and SEQ ID NO:3, respectively. The light chain variable region comprises complementary-determining regions (CDR1, CDR2, and CDR3) having amino acid sequences as shown in SEQ ID NO:9, SEQ ID NO:10, and SEQ ID NO:11, respectively. Compared with existing CD79B antibodies, the anti-CD79B protein monoclonal antibody provided in the present solution exhibits higher specificity and sensitivity, specific recognition of CD79B protein-expressing cells, and effective prevention of false-positive and false-negative results in immunological detection. The monoclonal antibody of the present invention not only overcomes the deficiencies of existing CD79B antibodies, but also significantly improves the accuracy of detection and diagnostic results.

Furthermore, the heavy chain variable region may further comprise framework regions (FR1, FR2, FR3, and FR4) having amino acid sequences as shown in SEQ ID NO:4, SEQ ID NO:5, SEQ ID NO:6, and SEQ ID NO:7, respectively.

Furthermore, the light chain variable region may further comprise framework regions (FR1, FR2, FR3, and FR4)

having amino acid sequences as shown in SEQ ID NO:12, SEQ ID NO:13, SEQ ID NO:14, and SEQ ID NO:15, respectively.

Furthermore, the heavy chain may have an amino acid sequence as shown in SEQ ID NO:8.

Furthermore, the light chain may have an amino acid sequence as shown in SEQ ID NO:16.

In a second aspect, the present invention further provides a detection reagent for CD79B protein, comprising the aforementioned anti-CD79B protein monoclonal antibody. By virtue of its enhanced specificity and sensitivity in specifically recognizing CD79B protein-expressing cells, the incorporation of the monoclonal antibody into the detection reagent enables superior detection performance.

In a third aspect, the present invention further provides a kit for detecting CD79B protein, comprising the anti-CD79B protein monoclonal antibody as described herein or the detection reagent containing the monoclonal antibody.

In a fourth aspect, the present invention provides the use of the anti-CD79B protein monoclonal antibody in immunological detection (e.g., a method of detecting CD79B protein using the present anti-CD79B protein monoclonal antibody). Owing to its high specificity and sensitivity in specifically recognizing CD79B protein-expressing cells, the monoclonal antibody is particularly suitable for immunological detection applications.

In a fifth aspect, the present invention provides the use of the anti-CD79B protein monoclonal antibody in immunohistochemical (IHC) detection (e.g., a method of detecting cells expressing a CD79B protein using the present anti-CD79B protein monoclonal antibody). Characterized by its high specificity and sensitivity in specifically recognizing CD79B protein-expressing cells, the monoclonal antibody is particularly suitable for IHC applications. Notably, it effectively reduces the occurrence of both false-positive and false-negative results in immunological testing, thereby significantly improving diagnostic accuracy.

In a sixth aspect, the present invention provides the use of the anti-CD79B protein monoclonal antibody in ELISA (Enzyme-Linked Immunosorbent Assay) detection (e.g., a method of performing an enzyme-linked immunosorbent assay using the present anti-CD79B protein monoclonal antibody). By virtue of its high specificity and sensitivity in specifically recognizing CD79B protein-expressing cells, the monoclonal antibody is particularly suitable for ELISA-based detection methods.

In a seventh aspect, the present invention provides the use of the anti-CD79B protein monoclonal antibody in chemiluminescence detection (e.g., a method of determining an amount of CD79B protein using the present anti-CD79B protein monoclonal antibody and a luminescent compound or agent). Due to its high specificity and sensitivity in specifically recognizing CD79B protein-expressing cells, the monoclonal antibody is particularly suitable for chemiluminescence-based detection systems.

Compared with prior art, the anti-CD79B protein monoclonal antibody and related products and uses thereof provided by the present invention demonstrate superior specificity and sensitivity in specifically recognizing CD79B protein-expressing cells. The invention not only proves applicable for immunological detection but also effectively prevents both false-positive and false-negative results, thereby significantly enhancing the accuracy of detection and diagnostic outcomes.

BRIEF DESCRIPTION OF THE DRAWINGS

To offer a more comprehensive understanding of the technical solutions presented in embodiments of the present invention, a concise introduction to the accompanying drawings utilized in the embodiments is provided below. It is important to note that these drawings solely represent specific embodiments of the invention and should not be regarded as restrictive to the scope. Those with ordinary skill in the relevant field can generate other relevant drawings based on these illustrations without significant creative effort.

FIG. 1A shows the result using the LBP2-CD79B according to the present invention; FIG. 1B shows the result using a commercially available CD79B (Abcam, EPR6861).

FIG. 1A shows the result using the LBP2-CD79B according to the present invention, while FIG. 2B shows the result using the commercially available CD79B (Abeam, EPR6861).

FIG. 5A shows the result using the LBP2-CD79B the commercially available CD79B antibody (Abcam, EPR6861), while FIG. 5B shows the result using the LBP2-CD79B according to the present invention.

DETAILED DESCRIPTION

The following section provides a comprehensive and precise description of the technical solutions presented in the embodiments of the present invention, in conjunction with the accompanying drawings. It is important to note that the described embodiments may constitute only a portion of the implementations of the present invention, rather than the entirety. Notably, components and/or results described herein and depicted in the accompanying drawings can be varied and/or can include additional components and/or data. Therefore, the detailed description presented below, pertaining to the embodiments illustrated in the drawings, is not intended to impose limitations on the scope of the claimed invention. Instead, it serves as a representation of selected embodiments of the present invention. Additionally, it should be emphasized that, based on these embodiments, all other implementations that skilled individuals in the art can derive without significant creative effort fall within the scope of protection of the present invention.

Embodiment 1

The present embodiment provides a method for preparing an anti-CD79B protein monoclonal antibody, comprising the following steps:

Step 1: Preparation of the Antigen.

In the present embodiment, the antigen comprises the extracellular domain (amino acids 29-159) of recombinant human CD79B (UniProt accession code: P40259), where the UniProt database provides detailed information including amino acid sequence, structural domains, and functional annotations corresponding to this accession number. The antibody-binding region of the CD79B antigen corresponds to its extracellular domain (AA 29-159). The antigen sequence (SEQ ID NO:17) is as follows:

ARSEDRYRNPKGSACSRIWQSPRFIARKRGFTVKMHCYMNSASGNVSWL

WKQEMDENPQQLKLEKGRMEESQNESLATLTIQGIRFEDNGIYFCQQKC

NNTSEVYQGCGTELRVMGFSTLAQLKQRNTLKD

For clarity of description, the recombinant human CD79B antigen in this embodiment is designated as "huCD79B."

Step 2: Immunization.

The CD79B antigen obtained in Step 1 was emulsified with complete Freund's adjuvant and administered via subcutaneous injection to multiple rabbits for three immunization cycles. Post-immunization, serum samples were collected and evaluated by ELISA and immunohistochemistry (IHC) to determine antibody titers. The rabbit exhibiting the highest anti-CD79B antibody titer was selected as the donor animal for subsequent single B-cell screening.

In this embodiment, for the huCD79B antigen, sequence alignment with homologous family members was performed and highly specific regions were selected as antigenic determinants. These selected epitopes were further conjugated with highly immunogenic haptens to enhance the immune response in experimental rabbits, thereby significantly improving the probability of obtaining specific antibodies.

Step 3: Single B Cell Screening and Sequencing.

The spleen was collected from the target animal, and B cells secreting specific antibodies were isolated by antigen-coated adsorption. After culturing, the B cell supernatant is collected, and B cells capable of secreting CD79B-binding antibodies were identified by ELISA. These B cells were lysed to obtain total RNA (ribonucleic acid). cDNA (complementary DNA) was synthesized using a reverse transcription kit, and the reverse transcription product was used as a template for PCR (polymerase chain reaction). The antibody-coding heavy chain variable region (VH) and light chain variable region (VL) sequences were amplified using specific primers under the following reaction conditions: For VH: 95° C. for 5 min; 35 cycles of 95° C. for 30 s, 70° C. for 30 s, 72° C. for 1 min; followed by 72° C. for 10 min. For VL: 95° C. for 5 min; 35 cycles of 95° C. for 30 s, 55° C. for 30 s, 72° C. for 1 min; followed by 72° C. for 10 min. The amplified products were analyzed by 1% agarose gel electrophoresis, and single target bands were selected for gel extraction. The gel-extracted target bands were combined with a mammalian cell expression vector containing constant region genes and transformed into TOP10 competent cells via homologous recombination. After incubation at 37° C. for 12 h, single clones were picked for sequencing. The sequencing results were analyzed using conventional software to screen for expression plasmids containing VH and VL sequences that conform to the characteristics of rabbit-derived antibodies.

In this embodiment, single B-cell sequencing technology is employed to enhance the efficiency of screening high-affinity antibodies and improve the cloning success rate. Since B cells cannot survive long-term in vitro, even ideal antibodies may be lost due to B-cell death. Traditional antibody screening methods predominantly utilize hybridoma technology, where B cells are fused with myeloma cells to confer immortality. However, this technique has limitations, with fusion success rates typically around 5%, and hybridoma cells may still experience intercellular rejection, ultimately leading to antibody information loss. The single B-cell sequencing technology involves using B-cell isolation equipment to sort individual B cells into culture plates. By employing nutrient-rich cell culture media supplemented with growth factors that stimulate B-cell proliferation, this method enables screening of B cells capable of expressing high-affinity antibodies with minimal loss. The selected B cells are then subjected to DNA sequencing. The obtained DNA sequences can be permanently preserved or regenerated by vector cloning techniques.

Step 4: Preparation and Purification of Monoclonal Antibodies from Cell Supernatant.

The confirmed positive expression vectors were used for large-scale cell transfection. After continued culturing for 3-5 days, the cell suspension was collected and centrifuged to obtain the supernatant. The supernatant was purified via affinity chromatography using Protein A to obtain highly purified antibodies. Finally, the purified anti-CD79B recombinant rabbit monoclonal antibody was quantified, aliquoted, labeled as LBP2-CD79B (Anti-CD79B Protein Monoclonal Antibody), and stored at 4° C.

The anti-CD79B recombinant rabbit monoclonal antibody obtained in this embodiment was sequenced. It includes a heavy chain and a light chain. The heavy chain comprises a heavy chain variable region and a heavy chain constant region. The light chain comprises a light chain variable region and a light chain constant region. The amino acid sequences of the complementary-determining regions CDR1, CDR2, and CDR3 of the heavy chain variable region are shown in SEQ ID NO:1, SEQ ID NO:2, and SEQ ID NO:3, respectively. The amino acid sequences of the framework regions FR1, FR2, FR3, and FR4 of the heavy chain variable region are shown in SEQ ID NO:4, SEQ ID NO:5, SEQ ID NO:6, and SEQ ID NO:7, respectively. For details, see Table 1. The complete amino acid sequence of the heavy chain is shown in SEQ ID NO:8, as detailed in Table 2.

TABLE 1

Sequence of the Heavy Chain Variable Region (VH) in Anti-CD79B Protein Monoclonal Antibody

| Heavy chain variable region (VH) | Amino Acid Sequence | Sequence Number |
|---|---|---|
| CDR1 | IDLSTNVMR | SEQ ID NO: 1 |
| CDR2 | GSMLISGNIY | SEQ ID NO: 2 |
| CDR3 | TRGRL | SEQ ID NO: 3 |
| FR1 | QSLEESGGRLVTPGGSLTLTCTVSG | SEQ ID NO: 4 |
| FR2 | WVRQAPGKGLEWI | SEQ ID NO: 5 |
| FR3 | YASWAKGRLTISKTSSTTVDLKMTSLTAADTATYFC | SEQ ID NO: 6 |
| FR4 | WGQGTLVTVSS | SEQ ID NO: 7 |

TABLE 2

Sequence of the Heavy Chain in Anti-CD79B Protein Monoclonal Antibody

| Monoclonal Antibody | Amino Acid Sequence | Sequence Number |
|---|---|---|
| Complete Heavy Chain | METGLRWLLLVAVLKGVQCQSLEESGGRLVTPGGSLTLTCTVSGIDLSTNVMRWVRQAPGKGLEWIGSMLISGNIYYASWAKGRLTISKT | SEQ ID NO: 8 |

TABLE 2-continued

Sequence of the Heavy Chain in Anti-CD79B Protein Monoclonal Antibody

| Monoclonal Antibody | Amino Acid Sequence | Sequence Number |
|---|---|---|
| | SSTTVDLKMTSLTAADTATYFCTRGRLWGQ GTLVTVSSGQPKAPSVFPLAPCCGDTPSST VTLGCLVKGYLPEPVTVTWNSGTLTNGVRT FPSVRQSSGLYSLSSVVSVTSSSQPVTCNV AHPATNTKVDKTVAPSTCSKPTCPPPELLG GPSVFIFPPKPKDTLMISRTPEVTCVVVDV SQDDPEVQFTWYINNEQVRTARPPLREQQF NSTIRVVSTLPIAHQDWLRGKEFKCKVHNK ALPAPIEKTISKARGQPLEPKVYTMGPPRE ELSSRSVSLTCMINGFYPSDISVEWEKNGK AEDNYKTTPAVLDSDGSYFLYSKLSVPTSE WQRGDVFTCSVMHEALHNHYTQKSISRSPGK | |

The amino acid sequences of the complementary-determining regions CDR1, CDR2, and CDR3 of the light chain variable region are shown in SEQ ID NO:9, SEQ ID NO:10, and SEQ ID NO:11, respectively. The amino acid sequences of the framework regions FR, FR2, FR3, and FR4 of the light chain variable region are shown in SEQ ID NO:12, SEQ ID NO:13, SEQ ID NO:14, and SEQ ID NO:15, respectively. For details, see Table 3. The complete amino acid sequence of the light chain is shown in SEQ ID NO:16, as detailed in Table 4.

TABLE 3

Sequence of the Light Chain Variable Region (VL) in Anti-CD79B Protein Monoclonal Antibody

| Light chain variable region (VL) | Amino Acid Sequence | Sequence Number |
|---|---|---|
| CDR1 | QSVWANNYLA | SEQ ID NO: 9 |
| CDR2 | | SEQ ID NO: 10 |
| CDR3 | IASASTLAS | SEQ ID NO: 11 |
| FR1 | CLGSYDCSSADCNA | SEQ ID NO: 12 |
| FR2 | QVLTQTPSSVSAAVGGTVTINCQSS | SEQ ID NO: 13 |
| FR3 | WYQQKPGQPPKIL | SEQ ID NO: 14 |
| FR4 | GVSSRFKGSGSGTQFTLTISDVQCD DAATYY | SEQ ID NO: 15 |

TABLE 4

Sequence of the Light Chain in Anti-CD79B Protein Monoclonal Antibody

| Monoclonal Antibody | Amino Acid Sequence | Sequence Number |
|---|---|---|
| Complete Light Chain | MDTRAPTQLLGLLLLWLPGATFAQVLTQT PSSVSAAVGGTVTINCQSSQSVWANNYLA WYQQKPGQPPKILIASASTLASGVSSRFK GSGSGTQFTLTISDVQCDDAATYYCLGSY DCSSADCNAFGGGTEVVVKGDPVAPTVLI FPPAADQVATGTVTIVCVANKYFPDVTVT WEVDGTTQTTGIENSKTPQNSADCTYNLS STLTLTSTQYNSHKEYTCKVTQGTTSVVQ SFNRGDC | SEQ ID NO: 16 |

Embodiment 2

This embodiment describes an immunohistochemical detection method using the anti-CD79B recombinant rabbit monoclonal antibody as the primary antibody, as follows:

(1) Sample section preparation: Paraffin-embedded sections of Jurkat cells, Daudi cells, diffuse large B-cell lymphoma, and various normal tissues that have been fixed with formalin are baked in a constant temperature oven at 60° C. for 1-2 hours and then stored for later use.

(2) An automated repair instrument was used for section deparaffinization, hydration, and repair. During this process, the temperature is preferably controlled at 95° C., and the time is preferably 30 minutes.

(3) The samples were immersed in a hydrogen peroxide tank for 10 minutes to block endogenous peroxidase activity, followed by rinsing with distilled water three times. Then, the target tissue was outlined with an immunohistochemistry pen, rinsed with distilled water twice, and immersed in phosphate-buffered saline with Tween 20 (PBST) for 2-3 minutes.

(4) Primary antibody incubation: 100 μL of the anti-CD79B recombinant rabbit monoclonal antibody was added to completely cover the tissue and incubated at room temperature for 1 hour, then rinsed with PBST three times, each time for 3 minutes.

(5) Secondary antibody incubation: The instructions provided with the secondary antibody staining kit were followed. The samples were incubated with the secondary antibody for 30 minutes, then rinsed with PBST three times, each time for 3 minutes.

(6) DAB staining: The DAB staining solution was prepared according to the kit instructions. An appropriate amount of the prepared DAB solution was added to completely cover the tissue, incubated for 10 minutes, then rinsed with distilled water three times, each time for 3 minutes.

(7) Counterstaining with hematoxylin: The manufacturer's instructions and recommendations for hematoxylin were followed to counterstain the sections for 2 minutes, then rinsed with PBST for 5 minutes to restore the blue color.

(8) Dehydration and clearing: The sections were dehydrated by immersing them in ethanol for 2-3 minutes, then air-dried.

(9) Mounting: Neutral gum was applied to the sections for mounting.

(10) Section scanning: The sections were scanned using an appropriate scanner.

(11) Result analysis and statistics: The results were analyzed and statistically evaluated.

Immunohistochemical staining results are typically categorized into positive and negative. Positive expression must be localized to the specific antigenic sites within cells and tissues to be considered positive. When the tissue staining distribution is clear and the cellular localization is accurate, the staining results can be further classified based on differences in staining intensity, as follows:
1. When the sample is weakly positive, it is marked as "+".
2. When the sample is moderately positive; it is marked as "++".
3. When the sample is strongly positive; it is marked as "+++".
4. The sample is negative; it is marked as "–".

The anti-CD79B monoclonal antibody of the present invention and a commercially available CD79B antibody (Abcam, EPR6861) were used to perform synchronous detection on 69 cases of diffuse large B-cell lymphoma, and the detection results were compared. The entire experimental process was designed as a double-blind study, and the immunohistochemical results of CD79B were statistically analyzed. The statistical results are shown in the following table:

TABLE 5

Statistical Analysis of CD79B Immunohistochemistry Results

| Organization Type | | LBP2-CD79B | | | | | CD79B (EPR6861) | | | | |
|---|---|---|---|---|---|---|---|---|---|---|---|
| | n | – | + | ++ | +++ | Pos. Rate | – | + | ++ | +++ | Pos. Rate |
| Diffuse Large B-cell Lymphoma | 69 | 0 | 5 | 16 | 48 | 100% | 0 | 5 | 29 | 35 | 100% |

First, the results shown in Table 5 indicate that the staining localization of LBP2-CD79B is accurate, with clear staining and no nonspecific staining, and a clean background. In immunohistochemical detection, the positivity rate is comparable to that of the commercially available antibody. Additionally, in 13 cases, the staining intensity of the LBP2-CD79B monoclonal antibody was higher than that of the commercially available antibody, indicating that the sensitivity of the LBP2-CD79B monoclonal antibody is higher than that of the commercially available antibody.

Figure 1A:
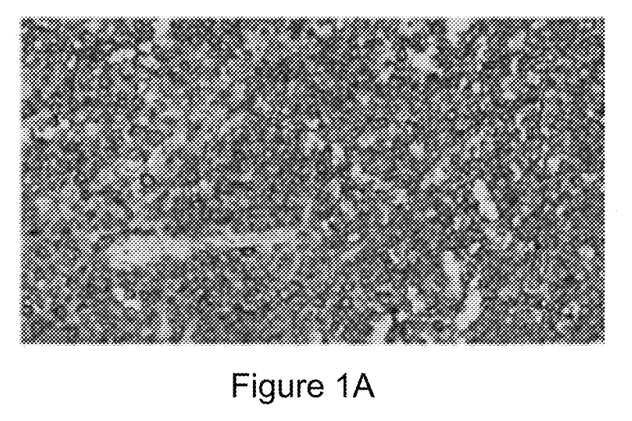
FIGS. 1A-B: comparative images of the immunohistochemical staining results for an example diffuse large B-cell lymphoma.
Figure 1B:
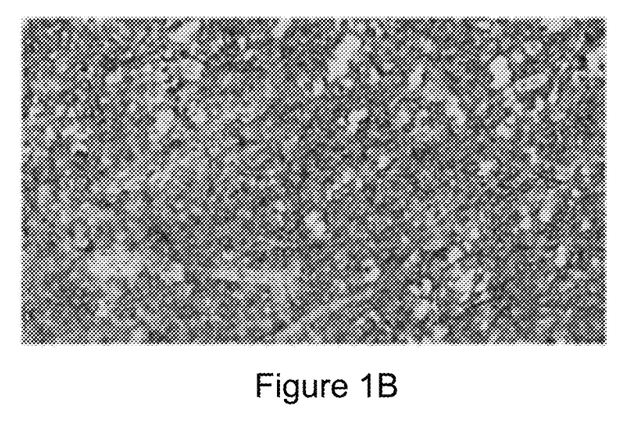

Second, FIGS. 1A-B show comparative images of the immunohistochemical staining results for an example diffuse large B-cell lymphoma. FIG. 1A used the LBP2-CD79B of the present invention, while FIG. 1B used the commercially available CD79B (EPR6861). From FIGS. 1A-B, it can be seen that for the same diffuse large B-cell lymphoma tissue, the staining intensity of the LBP2-CD79B monoclonal antibody of the present invention is significantly stronger than that of the commercially available CD79B (EPR6861).

Third, the results of the normal tissue microarray detection: The normal tissue microarray includes 24 types of normal tissue samples, which are mainly selected from fresh, promptly fixed surgical specimens.

The 24 types of normal tissue samples include: tonsil, appendix, lung, kidney, thyroid, pancreas, liver, stomach, testis, endometrium, cervix, fallopian tube, breast, placenta, prostate, colon, small intestine, thymus, spleen, salivary gland, esophagus, brain, skeletal muscle, and skin.

The results showed that the commercially available CD79B antibody (EPR6861) exhibited nonspecific staining in pancreatic, colorectal, and salivary gland tissues, leading to false-positive results. In contrast, the LBP2-CD79B monoclonal antibody prepared by the present invention does not display nonspecific staining in these tissues. This indicates that the LBP2-CD79B monoclonal antibody of the present invention has higher specificity than the commercially available antibody, effectively reducing the probability and risk of false positives, thereby contributing to improved diagnostic accuracy.

Figure 2A:
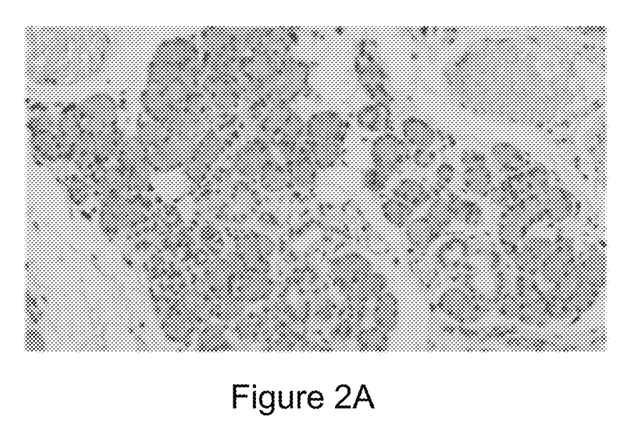
FIGS. 2A-B: comparative images of the immunohistochemical staining results of salivary gland tissue.
Figure 2B:
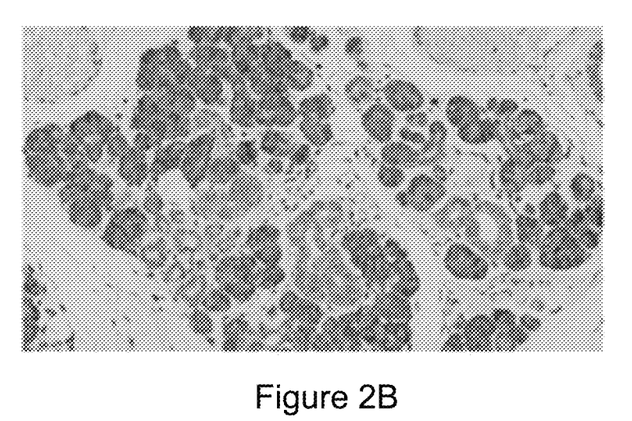

For example, FIGS. 2A-B show comparative images of the immunohistochemical staining results of salivary gland tissue. FIG. 2A used the LBP2-CD79B of the present invention, while FIG. 2B used the commercially available CD79B (EPR6861). Since CD79B is a B-lymphocyte-specific antigen, it should not be expressed in salivary gland tissue. As shown in FIG. 2, the LBP2-CD79B monoclonal antibody prepared by the present invention exhibits no staining in salivary gland tissue, indicating no false-positive results. In contrast, the commercially available CD79B (EPR6861) shows staining in salivary gland tissue, leading to false-positive results. This demonstrates that the LBP2-CD79B prepared by the present invention has better specificity compared with currently commercially available antibodies of the same category.

Embodiment 3

This embodiment describes the determination of the affinity of the anti-CD79B recombinant rabbit monoclonal antibody, with the method used being as follows:

The ability of the antibody to bind to the antigen is characterized using Biacore™ Surface Plasmon Resonance (SPR). Specifically, a Protein A chip was used (with channel 1 as the reference channel and channel 2 as the ligand channel). The antibody was immobilized as the ligand in channel 2 of the Protein A chip at a concentration of 10 g/ml, with an association time of 30 seconds and a flow rate of 10 l/min.

In this embodiment, human CD79B antigen was used as the analyte, with the antigen sample ID being huCD79B. The LBP2-CD79B monoclonal antibody from the present invention was used as the antibody. The antibody was diluted to concentrations of 125 nM, 62.5 nM, 31.25 nM, 15.63 nM, 7.81 nM, 3.91 nM, 1.95 nM, 0.98 nM, and 0 nM using running buffer.

In this embodiment, the analyte was flowed through both channel 1 and channel 2, with an association time of 60 seconds, a dissociation time of 90 seconds, and a flow rate of 30 µl/min. After the analyte injection was completed, the chip surface was regenerated using glycine buffer with a pH of 1.5. The ligand was immobilized before each analyte injection, and the chip surface was regenerated with the regeneration solution after the analyte injection was completed.

The affinity of the CD79B antibody for human CD79B antigen at the different concentrations mentioned above was determined using Biacore™ SPR. The corresponding analysis software was used to analyze the binding and dissociation with a 1:1 kinetic model. The results are shown in Table 6 and FIG. 3.

Figure 3:
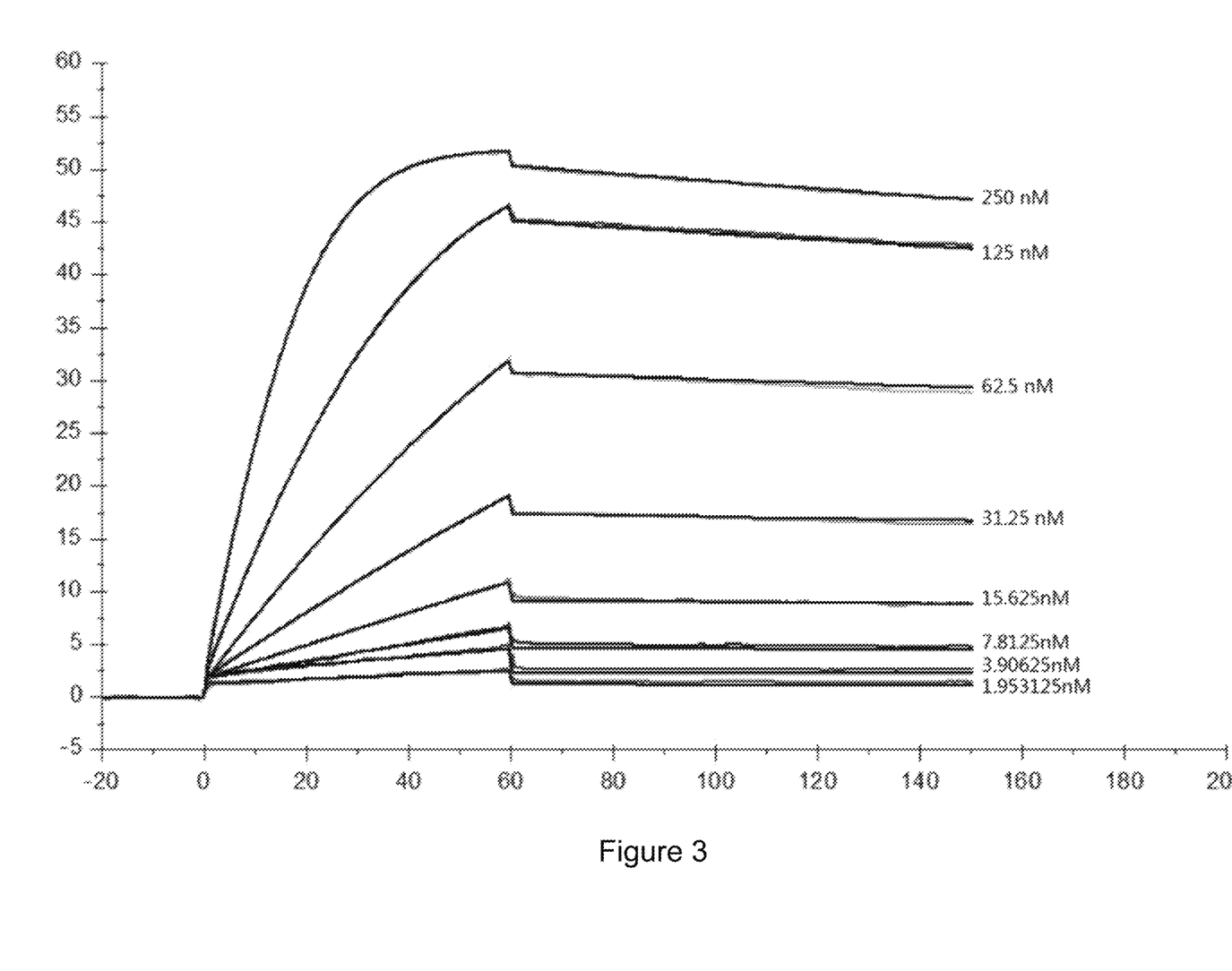
FIG. 3: a graph showing kinetic curves for the interaction between the LBP2-CD79B monoclonal antibody and the antigen at different concentrations.
Figure 4:
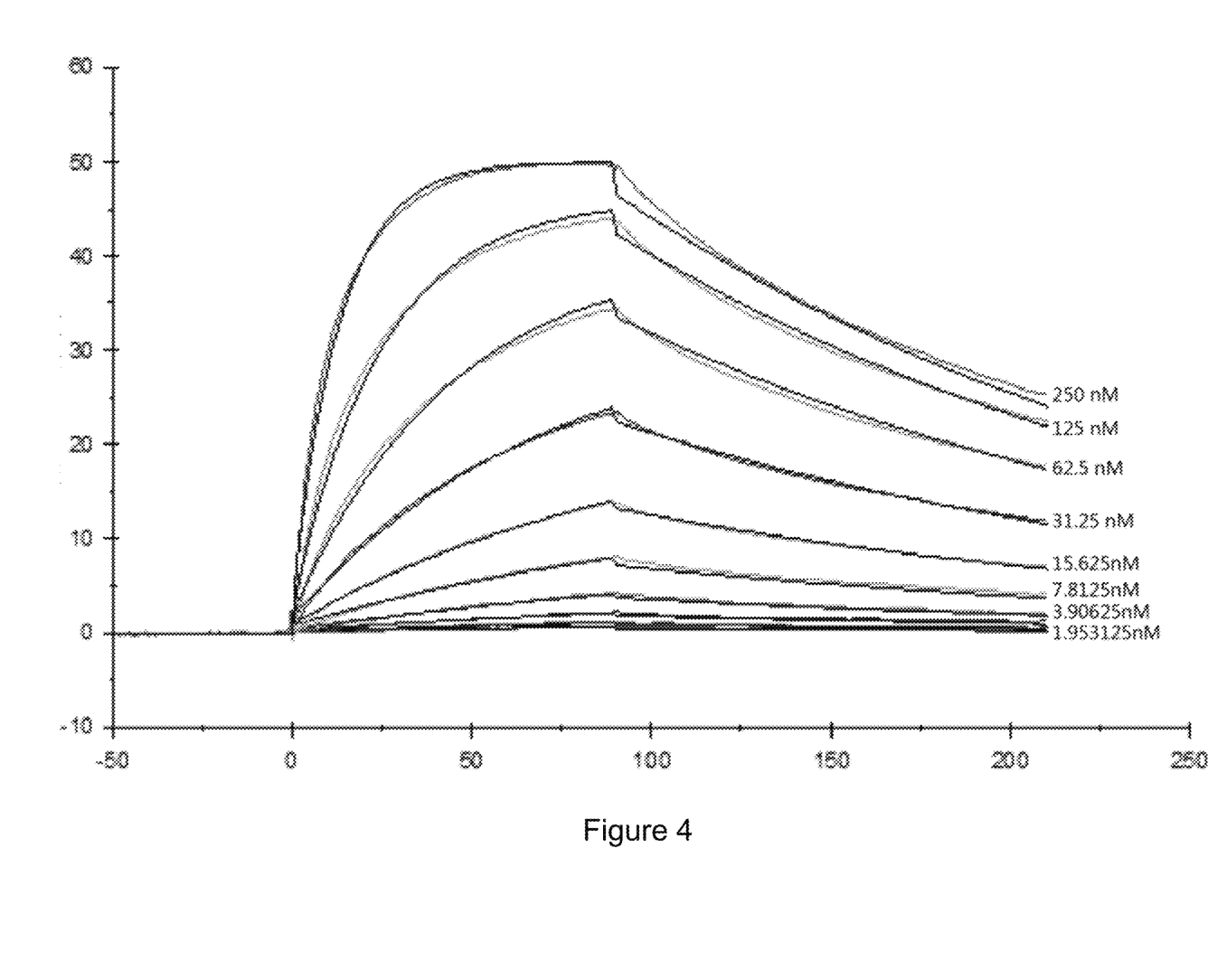
FIG. 4: a graph showing kinetic curves for the interaction between the commercially available CD79B antibody (Abcam, EPR6861) and the antigen at different concentrations.

Additionally, a control group was set up. In the control group, the antibody used was the commercially available CD79B antibody (Abcam, EPR6861), with all other test parameters and conditions being the same as those described above. The results are shown in Table 6 and FIG. 4. FIGS. 3 and 4 are the raw sensorgrams corresponding to the data in Table 6, in which the Y-axis represents the response value (in resonance units), and the X-axis represents elapsed time (in sec).

TABLE 6

Comparative Analysis of Affinity Measurement Results

| Control Group ID | Sample ID | KD (M) | kon (1/Ms) | Kdis (1/s) |
| --- | --- | --- | --- | --- |
| LBP2-CD79B | huCD79B | 8.77E−10 | 8.442E+05 | 7.754E−04 |
| EPR6861 | huCD79B | 1.934E−8 | 2.831E+05 | 5.474E−03 |

In Table 6, KD represents the dissociation constant, which is a comprehensive indicator of affinity. A lower KD value indicates a higher affinity between molecules, meaning that a lower concentration is required to achieve a certain level of binding. This implies that the two molecules are more likely to combine to form a complex and that the complex is more stable. The kon represents the association rate constant, which reflects the speed at which the antibody binds to the antigen. A higher value indicates a more efficient binding process. The Kdis represents the dissociation rate constant, which reflects the rate at which the complex dissociates. It is a core parameter for measuring the stability of the antibody-antigen complex. A lower value indicates a more stable complex and higher affinity. Therefore, by comparing the data in Table 6, it can be seen that the affinity of the LBP2-CD79B monoclonal antibody of the present invention for human CD79B antigen is much higher than that of the commercially available CD79B (Abcam, EPR6861) for human CD79B antigen. This suggests that the LBP2-CD79B monoclonal antibody of the present invention has higher sensitivity.

Embodiment 4

This embodiment describes Western blotting detection using the anti-CD79B recombinant rabbit monoclonal antibody LBP2-CD79B as the primary antibody, with the method used being as follows:

(1) Activation of the PVDF membrane: A polyvinylidene difluoride (PVDF) membrane containing Jurkat/Daudi cell lysate was selected for activation, and was activated with methanol for 1 minute, then washed three times with Tris-buffered saline with Tween (TBST) and blocked with 5% skim milk for 1 hour. TBST is a commonly used washing buffer suitable for experiments such as Western blotting. It contains three basic components: Tris buffer, saline (usually sodium chloride [e.g., 0.9 wt. %] in distilled and/or deionized water), and the surfactant Tween-20.

(2) Primary antibody incubation: The blocked PVDF membrane was placed into a solution containing the diluted LBP2-CD79B antibody and incubated overnight at 4° C. After incubation, the membrane was removed and washed five times with TBST, each time for 5 minutes.

(3) Secondary antibody incubation: The washed PVDF membrane was placed into a solution containing a diluted HRP-anti-rabbit IgG (1:10000) and incubated with shaking at room temperature for 1 hour. After incubation, the membrane was removed and washed five times with TBST, each time for 5 minutes.

Figure 5A:
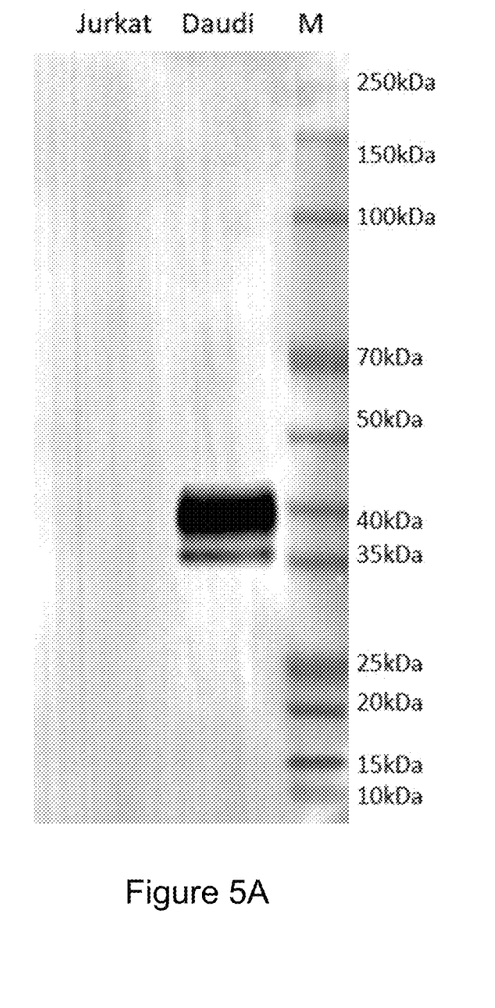
FIGS. 5A-B: comparative images of Western blot detection results.
Figure 5B:
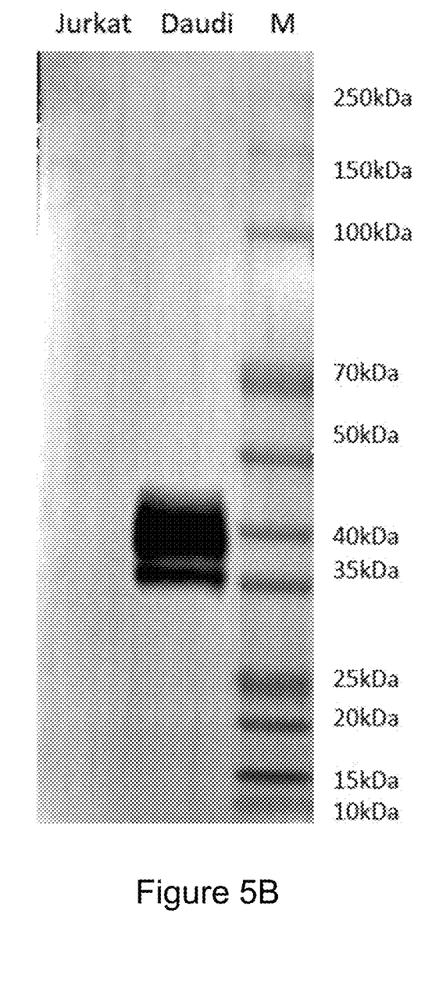

(4) The developing solution was prepared according to the instructions of the Immobilon Western Chemiluminescent HRP Substrate kit and evenly applied to the membrane. Using a GelView+6000Pro II multi-functional imaging workstation, the membrane was developed according to the instructions. The results are shown in FIGS. 5A-B, where FIG. 5B used the LBP2-CD79B prepared by the present invention, and FIG. 5A used the commercially available CD79B (Abcam, EPR6861).

The theoretical molecular weight of CD79B protein is around 26 kDa. However, due to post-translational modifications such as phosphorylation, the actual measured molecular weight is greater than the theoretical value. In FIGS. 5A-B, Daudi is a positive cell line, while Jurkat is a negative cell line. Both the CD79B monoclonal antibody prepared by the present invention and the commercially available CD79B antibody (Abcam, EPR6861) show no bands in Jurkat in the Western blotting results. However, the band sizes in Daudi are consistent, indicating that the anti-CD79B recombinant rabbit monoclonal antibody of the present invention can specifically recognize the CD79B protein with high specificity.

The above descriptions are merely specific embodiments of the present invention. However, the scope of protection of the present invention is not limited to these embodiments. Any changes or substitutions that can be readily conceived by those skilled in the art within the technical scope disclosed by the present invention should also be covered within the scope of protection of the present invention.

What is claimed is:

1. An anti-CD79B protein monoclonal antibody, comprising a heavy chain and a light chain, wherein the heavy chain includes a heavy chain variable region; the light chain includes a light chain variable region; the heavy chain variable region comprises complementary-determining regions CDR1, CDR2, and CDR3 having amino acid sequences as shown in SEQ ID NO:1, SEQ ID NO:2, and SEQ ID NO:3, respectively; and the light chain variable region comprises complementary-determining regions CDR1, CDR2, and CDR3 having amino acid sequences as shown in SEQ ID NO:9, SEQ ID NO:10, and SEQ ID NO:11, respectively.

2. The anti-CD79B protein monoclonal antibody according to claim 1, wherein the heavy chain variable region further comprises framework regions FR1, FR2, FR3, and FR4 having amino acid sequences as shown in SEQ ID NO:4, SEQ ID NO:5, SEQ ID NO:6, and SEQ ID NO:7, respectively.

3. The anti-CD79B protein monoclonal antibody according to claim 1, wherein the light chain variable region further comprises framework regions FR1, FR2, FR3, and FR4 having amino acid sequences as shown in SEQ ID NO:12, SEQ ID NO:13, SEQ ID NO:14, and SEQ ID NO:15, respectively.

4. The anti-CD79B protein monoclonal antibody according to claim 1, wherein the heavy chain has an amino acid sequence as shown in SEQ ID NO:8; and the light chain is has an amino acid sequence as shown in SEQ ID NO:16.

5. A reagent for detecting CD79B protein, comprising the anti-CD79B protein monoclonal antibody as claimed in claim 1.

6. A reagent for detecting CD79B protein, comprising the anti-CD79B protein monoclonal antibody as claimed in claim 2.

* * * * *

SEQUENCE LISTING

```
Sequence total quantity: 17
SEQ ID NO: 1          moltype = AA   length = 9
FEATURE               Location/Qualifiers
source                1..9
                      mol_type = protein
                      organism = synthetic construct
SEQUENCE: 1
IDLSTNVMR                                                              9

SEQ ID NO: 2          moltype = AA   length = 10
FEATURE               Location/Qualifiers
source                1..10
                      mol_type = protein
                      organism = synthetic construct
SEQUENCE: 2
```

-continued

```
GSMLISGNIY                                                          10

SEQ ID NO: 3              moltype = AA   length = 5
FEATURE                   Location/Qualifiers
source                    1..5
                          mol_type = protein
                          organism = synthetic construct
SEQUENCE: 3
TRGRL                                                               5

SEQ ID NO: 4              moltype = AA   length = 25
FEATURE                   Location/Qualifiers
source                    1..25
                          mol_type = protein
                          organism = synthetic construct
SEQUENCE: 4
QSLEESGGRL VTPGGSLTLT CTVSG                                         25

SEQ ID NO: 5              moltype = AA   length = 13
FEATURE                   Location/Qualifiers
source                    1..13
                          mol_type = protein
                          organism = synthetic construct
SEQUENCE: 5
WVRQAPGKGL EWI                                                      13

SEQ ID NO: 6              moltype = AA   length = 36
FEATURE                   Location/Qualifiers
source                    1..36
                          mol_type = protein
                          organism = synthetic construct
SEQUENCE: 6
YASWAKGRLT ISKTSSTTVD LKMTSLTAAD TATYFC                             36

SEQ ID NO: 7              moltype = AA   length = 11
FEATURE                   Location/Qualifiers
source                    1..11
                          mol_type = protein
                          organism = synthetic construct
SEQUENCE: 7
WGQGTLVTVS S                                                        11

SEQ ID NO: 8              moltype = AA   length = 451
FEATURE                   Location/Qualifiers
source                    1..451
                          mol_type = protein
                          organism = synthetic construct
SEQUENCE: 8
METGLRWLLL VAVLKGVQCQ SLEESGGRLV TPGGSLTLTC TVSGIDLSTN VMRWVRQAPG   60
KGLEWIGSML ISGNIYYASW AKGRLTISKT SSTTVDLKMT SLTAADTATY FCTRGRLWGQ   120
GTLVTVSSGQ PKAPSVFPLA PCCGDTPSST VTLGCLVKGY LPEPVTVTWN SGTLTNGVRT   180
FPSVRQSSGL YSLSSVVSVT SSSQPVTCNV AHPATNTKVD KTVAPSTCSK PTCPPPELLG   240
GPSVFIFPPK PKDTLMISRT PEVTCVVVDV SQDDPEVQFT WYINNEQVRT ARPPLREQQF   300
NSTIRVVSTL PIAHQDWLRG KEFKCKVHNK ALPAPIEKTI SKARGQPLEP KVYTMGPPRE   360
ELSSRSVSLT CMINGFYPSD ISVEWEKNGK AEDNYKTTPA VLDSDGSYFL YSKLSVPTSE   420
WQRGDVFTCS VMHEALHNHY TQKSISRSPG K                                  451

SEQ ID NO: 9              moltype = AA   length = 10
FEATURE                   Location/Qualifiers
source                    1..10
                          mol_type = protein
                          organism = synthetic construct
SEQUENCE: 9
QSVWANNYLA                                                          10

SEQ ID NO: 10             moltype = AA   length = 9
FEATURE                   Location/Qualifiers
source                    1..9
                          mol_type = protein
                          organism = synthetic construct
SEQUENCE: 10
IASASTLAS                                                           9

SEQ ID NO: 11             moltype = AA   length = 14
FEATURE                   Location/Qualifiers
source                    1..14
                          mol_type = protein
                          organism = synthetic construct
SEQUENCE: 11
```

```
CLGSYDCSSA DCNA                                                            14

SEQ ID NO: 12          moltype = AA  length = 25
FEATURE                Location/Qualifiers
source                 1..25
                       mol_type = protein
                       organism = synthetic construct
SEQUENCE: 12
QVLTQTPSSV SAAVGGTVTI NCQSS                                                25

SEQ ID NO: 13          moltype = AA  length = 13
FEATURE                Location/Qualifiers
source                 1..13
                       mol_type = protein
                       organism = synthetic construct
SEQUENCE: 13
WYQQKPGQPP KIL                                                             13

SEQ ID NO: 14          moltype = AA  length = 31
FEATURE                Location/Qualifiers
source                 1..31
                       mol_type = protein
                       organism = synthetic construct
SEQUENCE: 14
GVSSRFKGSG SGTQFTLTIS DVQCDDAATY Y                                         31

SEQ ID NO: 15          moltype = AA  length = 10
FEATURE                Location/Qualifiers
source                 1..10
                       mol_type = protein
                       organism = synthetic construct
SEQUENCE: 15
FGGGTEVVVK                                                                 10

SEQ ID NO: 16          moltype = AA  length = 239
FEATURE                Location/Qualifiers
source                 1..239
                       mol_type = protein
                       organism = synthetic construct
SEQUENCE: 16
MDTRAPTQLL GLLLLWLPGA TFAQVLTQTP SSVSAAVGGT VTINCQSSQS VWANNYLAWY           60
QQKPGQPPKI LIASASTLAS GVSSRFKGSG SGTQFTLTIS DVQCDDAATY YCLGSYDCSS          120
ADCNAFGGGT EVVVKGDPVA PTVLIFPPAA DQVATGTVTI VCVANKYFPD VTVTWEVDGT          180
TQTTGIENSK TPQNSADCTY NLSSTLTLTS TQYNSHKEYT CKVTQGTTSV VQSFNRGDC           239

SEQ ID NO: 17          moltype = AA  length = 131
FEATURE                Location/Qualifiers
source                 1..131
                       mol_type = protein
                       organism = Homo sapiens
SEQUENCE: 17
ARSEDRYRNP KGSACSRIWQ SPRFIARKRG FTVKMHCYMN SASGNVSWLW KQEMDENPQQ           60
LKLEKGRMEE SQNESLATLT IQGIRFEDNG IYFCQQKCNN TSEVYQGCGT ELRVMGFSTL          120
AQLKQRNTLK D                                                              131
```